(12) United States Patent
Takiuchi

(10) Patent No.: US 8,336,210 B2
(45) Date of Patent: Dec. 25, 2012

(54) METHOD FOR MANUFACTURING SPACERS FOR SPINDLE DEVICE

(75) Inventor: Hiroshi Takiuchi, Kuwana (JP)

(73) Assignee: NTN Corporation, Osaka (JP)

( * ) Notice: Subject to any disclaimer, the term of this patent is extended or adjusted under 35 U.S.C. 154(b) by 387 days.

(21) Appl. No.: 12/734,477

(22) PCT Filed: Oct. 30, 2008

(86) PCT No.: PCT/JP2008/003107
§ 371 (c)(1),
(2), (4) Date: May 4, 2010

(87) PCT Pub. No.: WO2009/060574
PCT Pub. Date: May 14, 2009

(65) Prior Publication Data
US 2010/0306991 A1   Dec. 9, 2010

(30) Foreign Application Priority Data
Nov. 7, 2007   (JP) .................................. 2007-289863

(51) Int. Cl.
*B21D 53/10* (2006.01)

(52) U.S. Cl. ..................... 29/898.07; 29/898.09; 29/898

(58) Field of Classification Search ............... 29/898.13, 29/898, 898.04, 898.061, 898.062, 898.064, 29/898.07, 898.09
See application file for complete search history.

(56) References Cited

U.S. PATENT DOCUMENTS

| | | | | |
|---|---|---|---|---|
| 4,172,621 A | * | 10/1979 | Yoshida | 384/563 |
| 5,030,016 A | * | 7/1991 | Schoeffter | 384/448 |
| 7,346,985 B1 | * | 3/2008 | Strait | 29/898.09 |

FOREIGN PATENT DOCUMENTS

| | | |
|---|---|---|
| DE | 11 2007 001 043 T5 | 4/2009 |
| JP | 3415211 | 4/2003 |
| JP | 2003-278775 | 10/2003 |
| JP | 2006-77835 | 3/2006 |
| JP | 2007-321977 | 12/2007 |

OTHER PUBLICATIONS

English Translation of the International Preliminary Report on Patentability mailed Jul. 8, 2010 in corresponding International Patent Application PCT/JP2008/003107.
International Search Report for PCT/JP2008/003107, mailed on Jan. 27, 2009.

* cited by examiner

*Primary Examiner* — David Bryant
*Assistant Examiner* — Ryan J Walters

(57) ABSTRACT

Inner and outer ring spacers include respective load bearing portions, which are positioned on respective sides of a gap of a predetermined size and which confront with each other in an axial direction. Each of the inner and outer ring spacers is divided into two spacer segments along a surface of division extending in a direction perpendicular to the axial direction and passing through the associated load bearing portions. Inner and outer ring divided spacer segments, having the load bearing portions, are simultaneously machined so as to have the same axially measured width. Along therewith, inner ring divided spacer segments, having no load bearing portions, are simultaneously machined so as to have the same axially measured width, thereby rendering the latter axially measured width to be larger than the former axially measured width by a quantity corresponding to the gap.

6 Claims, 4 Drawing Sheets

METHOD FOR MANUFACTURING SPACERS FOR SPINDLE DEVICE

CROSS REFERENCE TO RELATED APPLICATIONS

This application claims the benefit under 35 U.S.C. Section 371, of PCT International Application No. PCT/JP2008/003107, filed Oct. 30, 2008, which claimed priority to Japanese patent application No. 2007-289863, filed Nov. 7, 2007, the entire disclosures of which are herein incorporated by reference as a part of this application.

FIELD OF THE INVENTION

The present invention relates to a method of making spacers of a kind used in a spindle device, in which a main shaft is rotatably supported by a plurality of bearing units and inner and outer ring spacers are arranged between the neighboring bearing units.

BACKGROUND ART

In the machine tool, the spindle device used in such machine tool is of a structure, in which a main shaft front end side is supported relative to a spindle housing by a rolling bearing unit of a radial type capable of supporting an axial load and inner and outer ring spacers are provided proximate to the rolling bearing unit. At the front end side of the main shaft, a jig used in the machine tool is detachably mounted through a collet chuck. The jig clamped by the collet chuck is unclamped by a chuck drawing bar. The Patent Document 1 listed below discloses a technique associated with clamping and unclamping of the machine tool by means of the chuck drawing bar and the collet chuck operatively associated therewith.

With respect to this type of the spindle device for the machine tool, the applicant of the present invention has mass-produced and marketed such a product that in the event that the unclamping force relative to the clamping force of the collet chuck exceeds a permitted axial load of the rolling bearing unit, a portion of the axial load, which has exceeded the permitted axial load, can be supported by spacers provided in proximate to the rolling bearing unit. By employing this structure, even in the spindle device of the machine tool, in which a large unclamping force acts, there is no need to use either a bearing unit of a large size or a bearing unit specially designed, whichever for supporting the large unclamping force, and the spindle device can be manufactured compact in size and at a reduced cost.

[Patent Document 1] JP Patent No. 3415211

FIG. 5 is a sectional representation showing a rolling bearing assembly, used in the spindle device, and its periphery according to the product of the applicant mentioned above. A pair of rolling bearing units 3 and 3 are mounted on an outer periphery of a main shaft 1 and juxtaposed in a direction axially thereof, and an inner ring spacer 4 and an outer ring spacer 5 are interposed between the rolling bearing units 3 and 3. The inner ring spacer 4 and the outer ring spacer 5 are provided with respective load bearing portions 4b and 5c, which are so arranged as to confront with each other in the axial direction with a gap δ intervening therebetween. When the axial load exceeding the permitted axial load acts on the rolling bearing units 3 by the effect of an unclamping force P or the like acting on the main shaft 1, inner and outer rings 3a and 3b of each of the rolling bearing units 3 displace axially relative to each other. If such displacement takes place in a quantity exceeding a predetermined value, the load bearing portion 4b in the inner ring spacer 4 and the load bearing portion 5c in the outer ring spacer 5 are brought into contact with each other so that the axial load exceeding the permitted axial load can be received by the load bearing portions 4b and 5c. For this reason, the rolling bearing units 3 suffice if the permitted axial load can be secured during processing.

It has, however, been found that since the axial displacement of the inner and outer rings 3a and 3b of each of the rolling elements 3 depends considerably on the processing accuracy or the like of a machine tool, if the spindle device is so constructed as hereinabove described, it is necessary to severely control the dimensional accuracy of the gap δ delimited between the inner and outer ring spacers 4 and 5, which regulates the above described displacement. In order to secure the gap δ of a high dimensional accuracy, processing has to be performed while the dimensions of each of the inner ring spacer 4 and the outer ring spacer 5 is measured occasionally, followed by an adjustment process to be performed to secure the required gap δ. For this reason, it is difficult to manufacture the inner ring spacer 4 and the outer ring spacer 5, involving a problem associated with requirement of a substantial amount of labor in processing and a substantial cost.

SUMMARY OF THE INVENTION

An object of the present invention is to provide a spacer making method which is capable of accurately, easily and inexpensively making spacers employed in a spindle device, in which neither a bearing unit of a large size and a bearing unit of a kind specially designed for supporting an unclamping force is needed even in a spindle device for a machine tool, in which a large unclamping force acts.

The method of manufacturing spacers for the spindle device according to the present invention is a method of manufacturing spacers for a spindle device, in which device a main shaft of a machine tool is supported relative to a spindle housing by a rolling bearing unit of a radial type capable of supporting an axial load; inner and outer ring spacers are provided in proximate to the rolling bearing units; load bearing portions are provided in the inner and outer ring spacers, respectively, in a fashion confronting with each other in an axial direction with a gap intervening therebetween; the gap intervening between the load bearing portions is of a size sufficient to allow the load bearing portion on the side of the inner ring spacer and the load bearing portion on the side of the outer ring spacer to be brought into contact with each other in a condition, in which the inner and outer rings of the rolling bearing unit are displaced in position a predetermined quantity in the axial direction by the effect of a load brought about as a result of the axial load acting on the main shaft; each of the inner and outer ring spacers is divided into two divided spacer segments along a surface of division extending in a direction perpendicular to the axial direction and passing through the load bearing portions; the inner ring divided spacer segment of the inner ring spacer, having the load bearing portion, and the outer ring divided spacer segment of the outer ring spacer, having the load bearing portion, have equal axially measured widths and the inner ring divided spacer segment of the inner ring spacer, having no load bearing portion, and the outer ring divided spacer segment of the outer ring spacer, having no load bearing portion, have equal axially measured widths; and the axially measured widths of the latter are longer than the axially measured widths of the former by a quantity corresponding to the gap, which method includes machining the inner ring divided spacer segment of the inner ring spacer, having the load bearing portion, and the outer ring divided spacer segment of the outer ring spacer, having the load bearing portion, simultaneously, so as to allow them to have the same axially measured width, and, along therewith, machining the inner ring divided spacer segment of the inner ring spacer, having no load bearing portion, and the outer ring divided spacer segment of the outer ring spacer, having no load bearing portion, simultaneously, so as to allow them to have the same axially measured width, to thereby render the latter axially measured widths to be larger than the former axially measured widths by a quantity corresponding to the gap.

According to this spacer manufacturing method, there is no need to specifically define the respective axially measured widths of the inner ring divided spacer segment of the inner ring spacer, having the load bearing portion, and the outer ring divided spacer segment of the outer ring spacer, having the load bearing portion, as well as the respective axially measured widths of the inner ring divided spacer segment of the inner ring spacer, having no load bearing portion, and the outer ring divided spacer segment of the outer ring spacer, having no load bearing portion. Therefore, the difference between those axially measured widths suffices to be controlled so as to have a value matching with the required gap, the processing and the dimension control are simple to perform and an advantage can be appreciated in cost.

Also, since each of the inner ring spacer and the outer ring spacer is divided into two spacer segments along the surface of division lying perpendicular to the axial direction and passing through the associated load bearing portion with the load bearing position positioned on an end face of the divided spacer segment, processing of the load bearing portions is easy to perform. This processing of the load bearing portions can be performed together when the respective axially measured width of the inner ring divided spacer segment of the inner ring spacer, having the load bearing portion, and the outer ring divided spacer segment of the outer ring spacer, having the load bearing portion, are to be uniformalized, and when the respective axially measured width of the inner ring divided spacer segment of the inner ring spacer, having no load bearing portion, and the outer ring divided spacer segment of the outer ring spacer, having no load bearing portion, are to be uniformalized.

In the practice of the spacer manufacturing method of the present invention, the simultaneous processing of the inner ring divided spacer segment of the inner ring spacer, having the load bearing portion, and the outer ring divided spacer segment of the outer ring spacer, having the load bearing portion, so as to allow them to have the same axially measured width and the simultaneous processing of the inner ring divided spacer segment of the inner ring spacer, having no load bearing portion, and the outer ring divided spacer segment of the outer ring spacer, having no load bearing portion, so as to allow them to have the same axially measured width may be accomplished by a simultaneous grinding process or a simultaneous abrading process. The simultaneous grinding process is a process of grinding a plurality of to-be-processed items simultaneously whereas the simultaneous abrading process is a process of abrading a plurality of to-be-processed items simultaneously.

When for the processing the simultaneous processing is employed, the respective axially measured widths of the divided spacer segments of each set can be uniformalized accurately and easily.

Where the simultaneous processing is to be employed, the inner ring divided spacer segment of the inner ring spacer, having the load bearing portion, and the outer ring divided spacer segment of the outer ring spacer, having the load bearing portion, as well as the inner ring divided spacer segment of the inner ring spacer, having no load bearing portion, and the outer ring divided spacer segment of the outer ring spacer, having no load bearing portion may suffice to be processed while they are juxtaposed on a common simultaneous processing surface.

When the two divided spacer segments are processed while juxtaposed on the common simultaneous processing surface, the respective axially measured widths of those divided spacer segments can be accurately uniformalized and the processing efficiency becomes high.

In the practice of the spacer manufacturing method of the present invention, after the inner ring divided spacer segment of the inner ring spacer, having the load bearing portion, and the outer ring divided spacer segment of the outer ring spacer, having the load bearing portion, as well as the inner ring divided spacer segment of the inner ring spacer, having no load bearing portion, and the outer ring divided spacer segment of the outer ring spacer, having no load bearing portion, have been machined so as to have the same axially measured width, the inner ring divided spacer segment having the load bearing portion and the inner ring divided spacer segment having no load bearing portion are combined to provide the inner ring spacer and, on the other hand, the outer ring divided spacer segment having the load bearing portion and the outer ring divided spacer segment having no load bearing portion are combined to provide the outer ring spacer.

In the practice of the spacer manufacturing method of the present invention, the inner ring spacer and the outer ring spacer may be intervened between a plurality of rolling bearing units that are arranged in back-to-back relation with each other.

In the case of the spindle device of a type in which the bearing units are arranged in back-to-back relation with each other, support of the axial load brought about by the unclamping force because of the provision of the load bearing portions of the inner ring spacer and the side of the outer ring spacer confronting each other can be exhibited effectively.

In the practice of the spacer manufacturing method of the present invention, the inner ring spacer has an annular projection radially outwardly protruding therefrom and coaxial with a center of the spacer and the outer ring spacer has an annular projection radially inwardly protruding therefrom and coaxial with a center of the spacer, in which case respective side faces of those annular projections may define the load bearing portions in the inner and outer ring spacers.

In the practice of the spacer manufacturing method of the present invention, the outer ring spacer may include a nozzle for supplying a lubricant oil to the rolling bearing unit.

Where the outer ring spaces is of a type equipped with the nozzle, it represents a shape protruding radially inwardly and, therefore, the projecting shape can be concurrently employed in the annular projection that defines the respective load bearing portion.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

Figure 1:
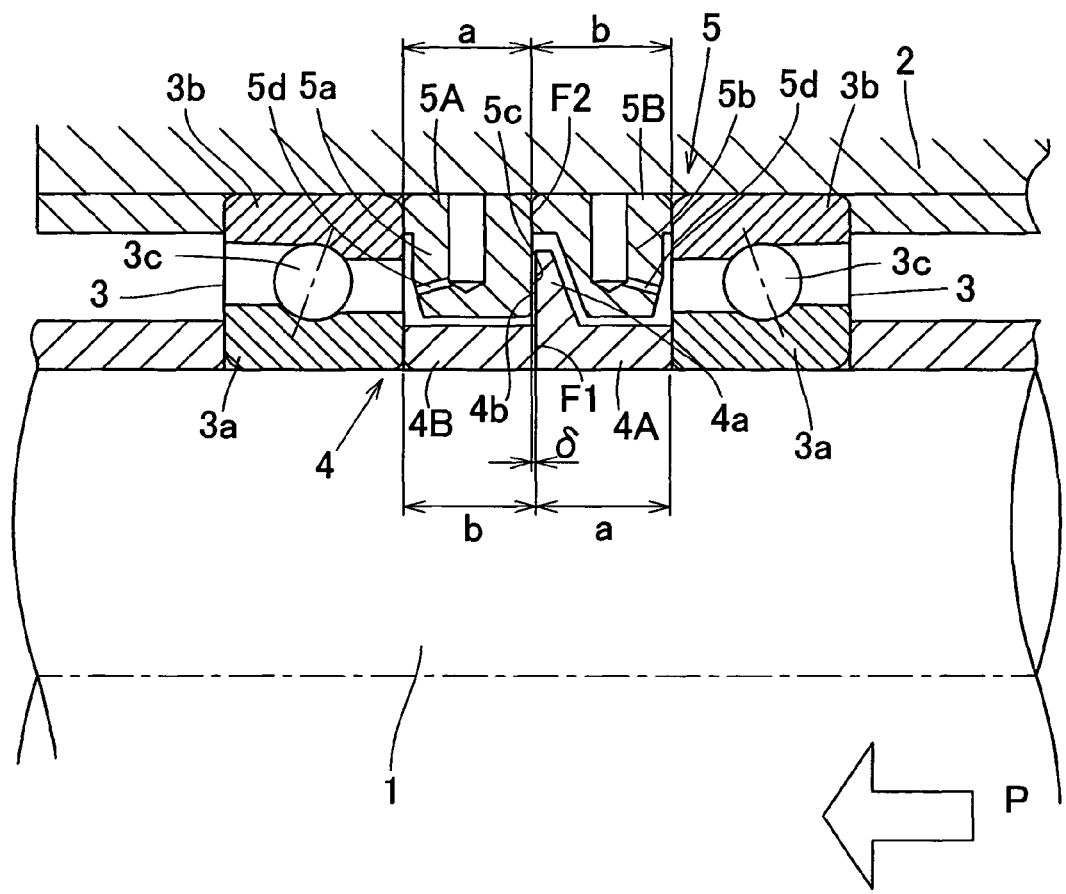
FIG. 1 is a fragmentary sectional view showing a spindle device equipped with spacers manufactured by a spacer manufacturing method according to the present invention.

One preferred embodiment of a spindle device equipped with spacers manufactured in accordance with a spacer manufacturing method of the present invention will now be described in detail with particular reference to FIGS. 1 to 3. This spindle device is used in a machine tool and includes a main shaft 1 rotatably supported relative to a spindle housing 2 by means of rolling bearing units 3 at respective locations spaced axially from each other. Each of those rolling bearing units 3 is a radial type bearing unit capable of supporting an axial load and is employed in the form of a single row angular contact ball bearing. Each of those respective angular contact ball bearing units 3 is of a type including an inner ring 3a, an outer ring 3b and balls 3c. The balls 3c are rolling elements, retained by a respective retainer (not shown) and interposed between the inner ring 3a and the outer ring 3b. Those angular contact ball bearing units 3 are arranged in back-to-back relation to each other. An inner ring spacer 4, mounted on an outer diametric surface of the main shaft 1, and an outer ring spacer 5, inserted inside an inner diametric surface of the spindle housing 2, are axially arranged intermediate between the angular contact ball bearing units 3 and 3.

The inner ring spacer 4 is divided along a surface of division F1, which lies perpendicular to the axial direction thereof, into two inner ring divided spacer segments 4A and 4B. One of the inner ring divided spacer segments, for example, the inner ring divided spacer segment 4A (on a right side as viewed in FIG. 1) is formed with an annular projection 4a protruding radially outwardly at one axial end thereof adjacent the other of the inner ring divided spacer segments, that is, the inner ring divided spacer segment 4B (on a left side as viewed in FIG. 1). A surface portion of this annular projection 4a, which is oriented towards the inner ring divided spacer segment 4B, lies on an extension of the dividing surface F1 and is rendered to be a load bearing portion 4b on the side of the inner ring spacer.

The outer ring spacer 5 is divided along a surface of division F2, which lies perpendicular to the axial direction thereof, into two outer ring divided spacer segments 5A and 5B. Those outer ring divided spacer segments 5A and 5B are formed with respective annular projections 5a and 5b protruding radially inwardly. Those annular projections 5a and 5b form a projection for the entirety of the outer ring spacer 5, and the annular projection 5a in one of those outer ring divided spacer segments, for example, the outer ring divided spacer segment 5A (on a left side as viewed in FIG. 1) extends over the substantially entire region in the axial direction of the outer ring divided spacer segment 5A. A surface portion of the annular projection 5a, which is oriented towards the outer ring divided spacer segment 5B, lies on an extension of the dividing surface F2 and is rendered to be a load bearing portion 5c on the side of the outer ring spacer.

The load bearing portion 4b on the side of the inner ring spacer and the load bearing portion 5c on the side of the outer ring spacer axially confront with each other with a gap δ intervening therebetween. The gap δ is of a size sufficient to allow the load bearing portion 4b on the side of the inner ring spacer the load bearing portion 5c on the side of the outer ring spacer to be brought into contact with each other in a condition in which the inner and outer rings 3a and 3b of the rolling bearing unit 3 are displaced in position a predetermined quantity in the axial direction by the effect of the load brought about due to the axial load acting on the main shaft 1. The predetermined quantity referred to above is a minimum value of the amount of displacement in position of the inner ring 3a and the outer ring 3b relative to each other in the axial direction when a load of a value equal to or higher than the permitted axial load acts on the rolling bearing unit 3, that is, the amount of displacement in position of the inner ring 3a and the outer ring 3b relative to each other in the axial direction when a load just corresponding to the permitted axial load acts on the rolling bearing unit 3. This gap δ may be, for example, a smaller value than that so long as the load bearing portions 4b and 5c will not contact each other under the influence of a load brought about during, for example, processing.

Each of the outer ring divided spacer segments 5A and 5B has a nozzle 5d defined therein for supplying a lubricant oil into a bearing space delimited between the inner ring 3a and the outer ring 3b of neighboring one of the rolling bearing units 3. Each of three nozzles 5d is provided in annular projections 5a and 5b, respectively. Each of the nozzles 5d is communicated with a lubricant oil supply passage (not shown) defined inside the spindle housing 2 and, therefore, raceway surfaces of the angular contact ball bearing units 3 are lubricated by a lubricant oil supplied from the nozzles 5d.

With respect to the respective widths of the inner ring divided spacer segments 4A and 4B as measured in the axial direction and those of the outer ring divided spacer segments 5A and 5B as similarly measured in the axial direction, the following relations establish. In other words, the inner ring divided spacer segment 4A having the load bearing portion 4b and the outer ring divided spacer segment 5A having the load bearing portion 5c have equal axially measured widths a and the inner ring divided spacer segment 4B having no load bearing portion 4b and the outer ring divided spacer segment 5B having the load bearing portion 5c have equal axially measured widths b. Also, the axially measured width b of the inner ring divided spacer segment 4B having no load bearing portion 4b and that of the outer ring divided spacer segment 5B having no load bearing portion 5c are larger than the axially measured width a of the inner ring divided spacer segment 4A having the load bearing portion 4b and that of the outer ring divided spacer segment 5B having the load bearing portion 5c by a quantity equal to the gap δ (i.e., b−a=δ). Those relations result from the method of making the inner ring spacer 4 and the outer ring spacer 5.

Hereinafter, the method of making the inner ring spacer 4 and the outer ring spacer 5 will be discussed.

Figure 2A:
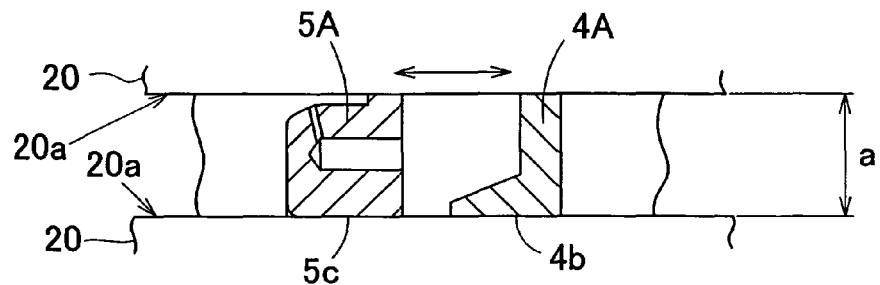
FIGS. 2A and 2B are explanatory diagrams showing the method of making the spacers for the spindle device.
Figure 2B:
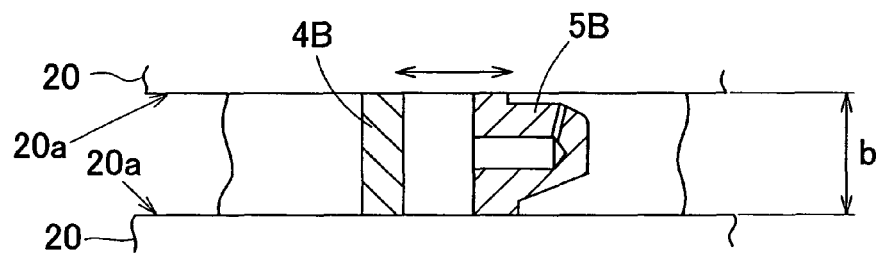

The inner ring divided spacer segment 4a having the load bearing portion 4b and the outer ring divided spacer segment 5A having the load bearing portion 5c are simultaneously machined so as to have the equal axially measured widths a. By way of example, as shown in FIG. 2A, by performing the machining while the inner ring divided spacer segment 4A and the outer ring divided spacer segment 5A are juxtaposed on a simultaneous machining surface 20a in the form of a grinding and polishing surface in a tool 20 such as, for example, a grind stone, it is possible to machine accurately and easily. Along therewith, the inner ring divided segment 4B having no load bearing portion 4b and the outer ring divided spacer segment 5B having no load bearing portion 5c are simultaneously machined so as to have the equal axially measured widths b. As is the case described previously, it is recommended to perform the machining while the inner ring divided spacer segment 4B and the outer ring divided spacer segment 5B are similarly juxtaposed on the simultaneous machining surface 20a as shown in FIG. 2B. It is recommended to perform those machining by controlling the machining so that the axially measured width b can be larger than the axially measured width a by a quantity corresponding to the gap δ. The method in which this simultaneous machining, shown in FIGS. 2A and 2B, is performed is a simultaneous grinding process.

Figure 3:
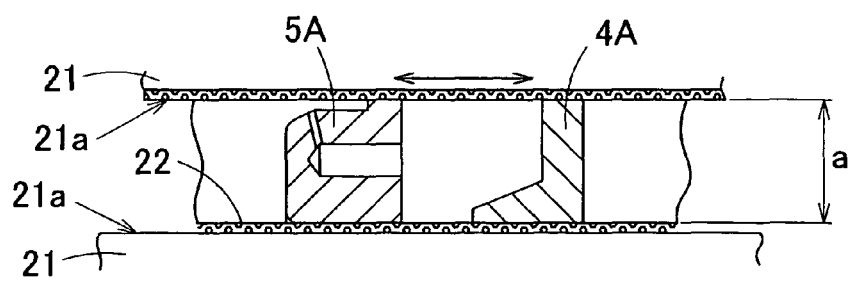
FIG. 3 is an explanatory diagram showing a different method of making the spacers for the spindle device.

When the axially measured widths of the inner ring divided spacer segment 4A and the outer ring divided spacer segment 5A, or those of the inner ring divided spacer segment 4B and the outer ring divided spacer segment 5B, are to be machined, it may be performed by intervening an abrasive coating between the smooth simultaneous machining surface 21a in a support 21 and such divided spacer segments so that the both may be abraded relative to each other as shown in FIG. 3. It is to be noted that FIG. 3 illustrates the inner ring divided spacer segment 4A and the outer ring divided spacer segment 5A are being machined. This simultaneous machining method shown in FIG. 3 is a simultaneous abrading process.

After by means of the above described method, the inner ring divided spacer segment 4A having the load bearing portion 4b and the outer ring divided spacer segment 5A having the load bearing portion 5c, as well as the inner ring divided spacer segment 4B having no load bearing portion 4b and the outer ring divided spacer segment 5B having no load bearing portion 5c have been machined so as to have the equal axially measured widths as hereinbefore described, the inner ring divided spacer segment 4A having the load bearing portion 4b and the inner ring divided spacer segment 4B having no load bearing portion 4b are combined to provide the inner ring spacer 4 and, on the other hand, the outer ring divided spacer segment 5A having the load bearing portion 5c and the outer ring divided spacer segment 5B having no load bearing portion 5c are combined to provide the outer ring spacer 5.

According to this spacer manufacturing method, since the axially measured widths a of the inner ring divided spacer segment 4A and the outer ring divided spacer segment 5A, as well as the axially measured widths b of the inner ring divided spacer segment 4B and the outer ring divided spacer segment 5B, are not specifically defined and what is required is to control the axially measured width a and the axially measured width b so as to provide a difference therebetween, which matches with a value corresponding to the required gap δ, the machining and the dimension measurement are simple and it is advantageous in terms of cost. The machining of the two divided spacer segments 4A and 5A (also, that of the divided spacer segments 4B and 5B) so as to have the same axially measured widths can be accurately and easily accomplished by the utilization of the simultaneous machining process referred to above.

Also, since each of the inner ring spacer 4 and the outer ring spacer 5 are divided into the two segments along the dividing surface F1 and F2, respectively, which lie perpendicular to the axial direction and pass across the associated load bearing portions 4b and 5c, the load bearing portions 4b and 5c are positioned on respective axial end faces of the inner ring divided spacer segment 4A and the outer ring divided spacer segment 5A and the load bearing portions 4b and 5c can therefore be easily machined. By way of example, as is the case with the foregoing embodiment, the load bearing portions 4b and 5c can be processed simultaneously with machining of the inner ring divided spacer segment 4A and the outer ring divided spacer segment 5A so as to have the equal axially measured widths.

In view of the foregoing, the inner ring spacer 4 and the outer ring spacer 5 can be accurately and easily machined and, hence, manufactured, and the cost of manufacture thereof can therefore be suppressed.

In the spindle device of the construction hereinbefore described, the load bearing portions 4b and 5c, which are axially confronted with each other, are provided respectively in the inner ring spacer 4 and the outer ring spacer 5 with the gap δ intervening therebetween. Accordingly, even in the case that an unclamping force P shown in FIG. 1 acts on the main shaft 1 to such an extent as to result in an axial load, of a magnitude larger than the permitted axial load, on the rolling bearing unit 3 and as a result, the inner ring 3a and the outer ring 3b of the rolling bearing unit 4 displace relative to each other in the axial direction, and if such displacement occurs in a quantity larger than a predetermined value, the load bearing portions 4b and 5c in the inner ring spacer 4 and the outer ring spacer 5 are brought into contact with each other to support the axial load then exceeding the permitted axial load.

For the reason discussed above, the rolling bearing unit 3 suffices if the permitted axial load can be secured during the machining, and there is no need to increase the size of the bearing unit and to employ a specially designed bearing in which the permitted axial load is increased, and, therefore, an undesirable increase in size and that in cost can advantageously be suppressed.

It is to be noted that although during unclamping the load bearing portion 4b on the side of the inner ring spacer 4 and the load bearing portion 5c on the side of the outer ring spacer 5 are brought into contact with each other, such contact between the load bearing portions 4b and 5c will not lead to any problem on the operation of the spindle device. This is because the unclamping takes place during the halt of rotation of the rolling bearing unit 3 and such contact does not therefore occur during the operation of the spindle device.

Figure 4:
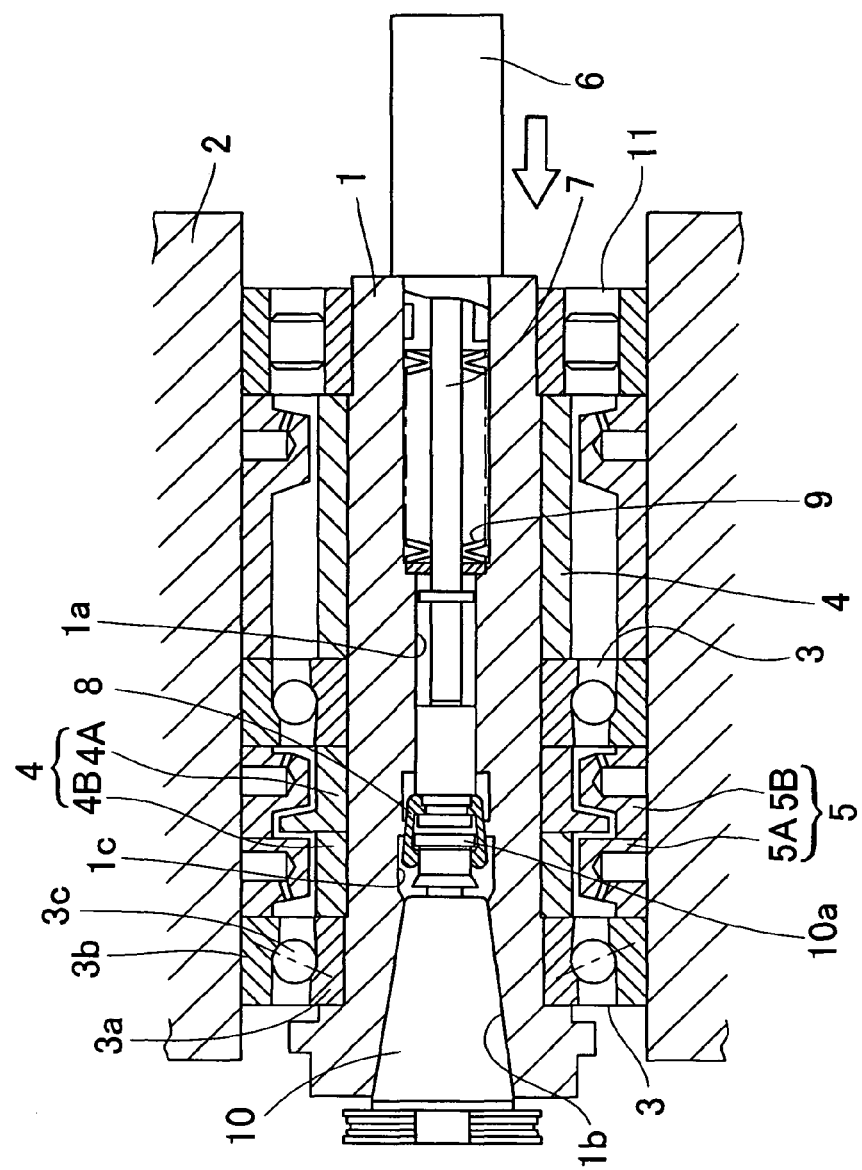
FIG. 4 is an overall sectional view showing the spindle device.
Figure 5:
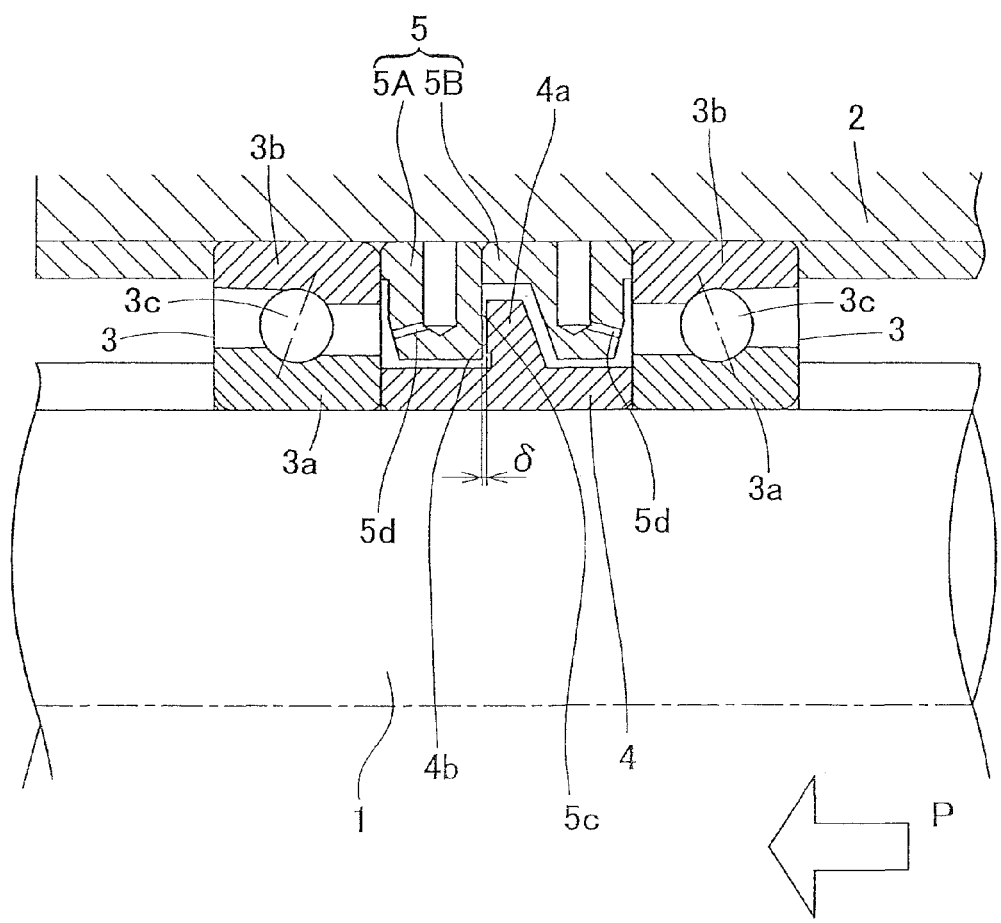
FIG. 5 is a fragmentary sectional view showing the spindle device hitherto suggested.

The spindle device in its entirety is shown in a sectional representation in FIG. 4. The illustrated spindle device is of a design, in which a one end portion of the main shaft 1 is supported by two rows of angular contact ball bearing units 3 and 3, which are shown and described with particular reference to FIG. 1, and the other end portion thereof opposite to the one end portion is supported by a cylindrical roller bearing unit 11.

The main shaft 1 is rendered to be a hollow shaft having an inner diametric hole 1a defined therein and has a tapered hole 1b defined at one end thereof for engagement with a tapered shank portion of a tool 10 and is provided with a collet chuck 8, on the other end side of the tapered hole 1b, for holding a pull stud 10a of the tool 10. The collet chuck 8 is of a type capable of clamping the tool 10 when a chuck drawing bar 7, which is inserted inside the inner diametric hole 1a in the main shaft 1, is pulled rearwardly (in one end side direction), and the pulling force applied to the chuck drawing bar 7 is in turn applied at all times by means of a spring member 9 built in the main shaft 1. The chuck drawing bar 7, when an operating portion 6, provided at the other end or an intermediate position of the main shaft 1, is pressed in one end side direction forwardly of the main shaft (direction shown by the arrow), allows the collet chuck 8 to unclamp. For this reason, when the unclamping operation is performed, the unclamping force acts on the main shaft 1 to move the latter in the one end side direction.

In the conventional spindle device this unclamping force is received by, for example, an angular contact ball bearing, which is the rolling bearing unit of a radial type, but in the illustrated embodiment of the present invention, when the unclamping force of a magnitude higher than a predetermined value acts, it can be supported by the load bearing portions 4b and 5c in the inner ring spacer 4 and the outer ring spacer 5, respectively, which are then brought into contact with each other as described particularly with reference to FIG. 1.

Although in describing the foregoing embodiment of the present invention, reference has been made to the use of the angular contact ball bearing as the rolling bearing unit 3, the rolling bearing unit 3 that can be employed in the practice of the present invention may be a cylindrical roller bearing, a deep groove ball bearing or any other rolling bearing. Also, the bearing unit that can be used in the practice of the present invention may be a multiple row rolling bearing. In addition, although the main shaft has been shown and described as supported by the two angular contact ball bearing units, three or more bearing units may be employed for that purpose.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention.

Accordingly, such changes and modifications are, unless they depart from the scope of the present invention as delivered from the claims annexed hereto, to be construed as included therein.

What is claimed is:

1. A method of manufacturing spacers for a spindle device, in which device a main shaft of a machine tool is supported relative to a spindle housing by a rolling bearing unit of a radial type capable of supporting an axial load; inner and outer ring spacers are provided in proximate to the rolling bearing units; load bearing portions are provided in the inner and outer ring spacers, respectively, in a fashion confronting with each other in an axial direction with a gap intervening therebetween; the gap intervening between the load bearing portions is of a size sufficient to allow the load bearing portion on the side of the inner ring spacer and the load bearing portion on the side of the outer ring spacer to be brought into contact with each other in a condition, in which the inner and outer rings of the rolling bearing unit are displaced in position a predetermined quantity in the axial direction by the effect of a load brought about as a result of the axial load acting on the main shaft; each of the inner and outer ring spacers is divided into two divided spacer segments along a surface of division extending in a direction perpendicular to the axial direction and passing through the load bearing portions; the inner ring divided spacer segment of the inner ring spacer, having the load bearing portion, and the outer ring divided spacer segment of the outer ring spacer, having the load bearing portion, have equal axially measured widths and the inner ring divided spacer segment of the inner ring spacer, having no load bearing portion, and the outer ring divided spacer segment of the outer ring spacer, having no load bearing portion, have equal axially measured widths; and the axially measured widths of the latter are longer than the axially measured widths of the former by a quantity corresponding to the gap, which method comprises:

machining the inner ring divided spacer segment of the inner ring spacer, having the load bearing portion, and the outer ring divided spacer segment of the outer ring spacer, having the load bearing portion, simultaneously, so as to allow them to have the same axially measured width, and, along therewith, machining the inner ring divided spacer segment of the inner ring spacer, having no load bearing portion, and the outer ring divided spacer segment of the outer ring spacer, having no load bearing portion, simultaneously, so as to allow them to have the same axially measured width, to thereby render the latter axially measured widths to be larger than the former axially measured widths by a quantity corresponding to the gap.

2. The method of manufacturing the spacers for the spindle device as claimed in claim 1, in which the machining of the inner ring divided spacer segment of the inner ring spacer, having the load bearing portion, and the outer ring divided spacer segment of the outer ring spacer, having the load bearing portion, simultaneously, so as to allow them to have the same axially measured width and the machining of the inner ring divided spacer segment of the inner ring spacer, having no load bearing portion, and the outer ring divided spacer segment of the outer ring spacer, having no load bearing portion, simultaneously, so as to allow them to have the same axially measured width are accomplished by a simultaneous grinding process or a simultaneous abrading process.

3. The method of manufacturing the spacers for the spindle device as claimed in claim 1, in which after the inner ring divided spacer segment of the inner ring spacer, having the load bearing portion, and the outer ring divided spacer segment of the outer ring spacer, having the load bearing portion, as well as the inner ring divided spacer segment of the inner ring spacer, having no load bearing portion, and the outer ring divided spacer segment of the outer ring spacer, having no load bearing portion, have been machined so as to have the same axially measured width, the inner ring divided spacer segment having the load bearing portion and the inner ring divided spacer segment having no load bearing portion are combined to provide the inner ring spacer and, on the other hand, the outer ring divided spacer segment having the load bearing portion and the outer ring divided spacer segment having no load bearing portion are combined to provide the outer ring spacer.

4. The method of manufacturing the spacers for the spindle device as claimed in claim 1, in which the inner ring spacer and the outer ring spacer are intervened between a plurality of rolling bearing units that are arranged in back-to-back relation with each other.

5. The method of manufacturing the spacers for the spindle device as claimed in claim 1, in which the inner ring spacer has an annular projection radially outwardly protruding therefrom and coaxial with a center of the spacer and the outer ring spacer has an annular projection radially inwardly protruding therefrom and coaxial with a center of the spacer, and in which respective side faces of those annular projections define the load bearing portions in the inner and outer ring spacers.

6. The method of manufacturing the spacers for the spindle device as claimed in claim 1, in which the outer ring spacer comprises a nozzle for supplying a lubricant oil to the rolling bearing unit.

* * * * *